United States Patent
Park et al.

(10) Patent No.: US 11,741,607 B2
(45) Date of Patent: Aug. 29, 2023

(54) ELECTRONIC DEVICE, METHOD, AND COMPUTER PROGRAM FOR CALCULATING BLEEDING SITE AND TRAJECTORY OF BLOODSTAIN SCATTERED BY IMPACT

(71) Applicant: REPUBLIC OF KOREA (NATIONAL FORENSIC SERVICE DIRECTOR MINISTRY OF THE INTERIOR AND SAFETY), Wonju-si (KR)

(72) Inventors: Nam Kyu Park, Bucheon-si (KR); Jae Mo Goh, Wonju-si (KR); Jin Pyo Kim, Daejeon (KR); Young Il Seo, Wonju-si (KR); Eun Ah Joo, Yongin-si (KR); Je Hyun Lee, Wonju-si (KR); Sang Yoon Lee, Wonju-si (KR); Kyung Mi Kim, Namyangju-si (KR)

(73) Assignee: REPUBLIC OF KOREA (NATIONAL FORENSIC SERVICE DIRECTOR MINISTRY OF THE INTERIOR AND SAFETY), Wonju-si (KR)

( * ) Notice: Subject to any disclaimer, the term of this patent is extended or adjusted under 35 U.S.C. 154(b) by 355 days.

(21) Appl. No.: 17/099,023

(22) Filed: Nov. 16, 2020

(65) Prior Publication Data
US 2022/0067937 A1 Mar. 3, 2022

(30) Foreign Application Priority Data
Sep. 1, 2020 (KR) .................. 10-2020-0111020

(51) Int. Cl.
*G06T 7/00* (2017.01)
*G06T 15/00* (2011.01)
*G06T 15/10* (2011.01)

(52) U.S. Cl.
CPC .............. *G06T 7/0014* (2013.01); *G06T 7/97* (2017.01); *G06T 15/005* (2013.01); *G06T 15/10* (2013.01)

(58) Field of Classification Search
CPC ....................................................... G06V 10/20
See application file for complete search history.

(56) References Cited

U.S. PATENT DOCUMENTS

2016/0225179 A1* 8/2016 Sheppard .............. G06T 19/003
2019/0370991 A1* 12/2019 Park ....................... G01B 11/26

FOREIGN PATENT DOCUMENTS

KR 101588323 B1 * 10/2014
KR 10-1588322 B1 2/2016

OTHER PUBLICATIONS

Shinde et al.,Blood Spatter Trajectory Analysis for Spatter Source Reconstruction Using Image Processing, 2016 Conference on Advances in Signal Processing (CASP) Cummins College of Engineering for Women, Pune. Jun. 9-11, 2016. pp. 375-380.*

(Continued)

*Primary Examiner* — Guillermo M Rivera-Martinez
(74) *Attorney, Agent, or Firm* — Hauptman Ham, LLP

(57) ABSTRACT

A method of calculating a bleeding site and a trajectory of a bloodstain scattered by impact includes: obtaining, by an electronic device calculating the bleeding site and the trajectory of the bloodstain scattered by impact, captured image information; analyzing the obtained captured image information, by the electronic device, and calculating a collision angle and measuring a direction angle of the bloodstain scattered by impact; calculating, by the electronic device, a coordinate value of the bleeding site by using a linear trajectory method; calculating, by the electronic device, a trajectory of a drop of blood based on the calculated coordinate value of the bleeding site by using a parabolic trajectory method considering gravity and air (Continued)

resistance; and displaying and outputting, by the electronic device, a linear trajectory of the drop of blood and a parabolic trajectory considering gravity and air resistance of the drop of blood on a 3D space.

11 Claims, 11 Drawing Sheets

(56) References Cited

OTHER PUBLICATIONS

Attinger et al., Determining the region of origin of blood spatter patterns considering fluid dynamics and statistical uncertainties, 2019, Forensic Science International 298 (2019), doi.org/10.1016/j.forsciint.2019.02.003, pp. 323-331.*

Attinger et al., Fluid dynamics topics in bloodstain pattern analysis: Comparative review and research opportunities, 2013, Forensic Science International 231 (2013), dx.doi.org/10.1016/j.forsciint.2013.04.018, pp. 375-396.*

Boonkhong et al., Impact angle analysis of bloodstains using a simple image processing technique, 2010, Songklanakarin J. Sci. Technol., vol. 32 (2), pp. 169-173.*

Hakim et al., "Calculating Point of Origin of Blood Spatter Using Laser Scanning Technology", 2015, J Forensic Sci, Mar. 2015, vol. 60, No. 2, pp. 409-417, doi: 10.1111/1556-4029.12639.*

Zarrabeitia et al., "Extraction of Blood Droplet Flight Trajectories from Videos for Forensic Analysis", 2012, In Proceedings of the 1st International Conference on Pattern Recognition Applications and Methods, pp. 142-153, DOI: 10.5220/0003770201420153.*

Shoumy et al. "Analytical Analysis of Blood Spatter Trajectory for Crime Scene Investigation", 2015, Journal of Theoretical and Applied Information Technology Mar. 10, 2015. vol. 73 No.1, pp. 72-79.*

Laan et al., Bloodstain Pattern Analysis: implementation of a fluid dynamic model for position determination of victims, 2015. Sci Rep 5, 11461 (2015), pp. 1-8, //doi.org/10.1038/srep11461.*

* cited by examiner

ELECTRONIC DEVICE, METHOD, AND COMPUTER PROGRAM FOR CALCULATING BLEEDING SITE AND TRAJECTORY OF BLOODSTAIN SCATTERED BY IMPACT

CROSS-REFERENCE TO RELATED APPLICATION

This application claims the benefit of Korean Patent Application No. 10-2020-0111020, filed on Sep. 1, 2020, in the Korean Intellectual Property Office, the disclosure of which is incorporated herein in its entirety by reference.

BACKGROUND

1. Field

One or more embodiments relate to an electronic device, a method, and a computer program for calculating a bleeding site and a trajectory of a bloodstain scattered by impact.

2. Description of the Related Art

In criminal cases, bloodstain pattern analysis plays an important role in reconstructing the scene of bloodshed. Knowing a bleeding site of a bloodstain scattered by impact in the bloodstain pattern analysis is important because the examiner may determine in which position and posture the victim was hit by the perpetrator.

Currently, a linear trajectory method based on the assumption that drops of blood fly in a straight line is used to calculate the bleeding site of the bloodstain scattered by impact. Because actual scattered drops of blood undergo a parabolic motion under the influence of gravity and air resistance, a calculation result of the bleeding site by the linear trajectory method is different from the actual bleeding site.

In addition, calculation of the bleeding site by a method of calculating a trajectory of a drop of blood considering the influence of gravity and air resistance is difficult to implement as a program because input data is too small with only bloodstains observed in the crime scene.

[Prior art document] Korean Patent No. 10-1588322 (registered on Jan. 19, 2016)

SUMMARY

One or more embodiments include to an electronic device, a method, and a computer program for calculating a bleeding site and a trajectory of a bloodstain scattered by impact, the electronic device representing the bleeding site of the bloodstain scattered by impact in a three-dimensional (3D) space by the conventional linear trajectory method, and calculating a parabolic trajectory using a coordinate value of the bleeding site of the bloodstain scattered by impact as an initial condition value of a drop of blood and implementing the parabolic trajectory in the same space.

According to one or more embodiments, a method of calculating a bleeding site and a trajectory of a bloodstain scattered by impact includes: obtaining, by an electronic device calculating the bleeding site and the trajectory of the bloodstain scattered by impact, captured image information including a captured image and a 3D coordinate value of each of two or more bloodstains scattered by impact; analyzing the obtained image information, by the electronic device, and calculating a collision angle and measuring a direction angle of the bloodstain scattered by impact; calculating, by the electronic device, a coordinate value of the bleeding site by using a linear trajectory method; calculating, by the electronic device, a trajectory of a drop of blood based on the calculated coordinate value of the bleeding site by using a parabolic trajectory method considering gravity and air resistance; and displaying and outputting, by the electronic device, a linear trajectory of the drop of blood and a parabolic trajectory considering gravity and air resistance of the drop of blood on a 3D space.

The collision angle may be calculated by the following equation by measuring the length and width of the bloodstain scattered by impact in the captured image.

$$\alpha = \sin^{-1}\left(\frac{W}{L}\right)$$

(where $\alpha$ is a collision angle, L is a length of the bloodstain scattered by impact, and W is a width of the bloodstain scattered by impact.)

In the calculating of the coordinate value of the bleeding site, coordinate values $(x_0, y_0, z_0)$ of the bleeding site may be calculated by the following equation.

$$x_0 = D\sin(\beta_L)\sin(\beta_R)/\sin(\beta_L+\beta_R)$$

$$y_0 = D\cos(\beta_L)\sin(\beta_R)/\sin(\beta_L+\beta_R)$$

$$z_0 = c - \frac{x_0}{\tan\beta \tan\gamma}$$

$$\beta_L = \tan^{-1}[\tan(\alpha_L)/\sin(\gamma_L)]$$

$$\beta_R = \tan^{-1}[\tan(\alpha_R)/\sin(\gamma_R)]$$

(where D is a distance between two bloodstains scattered by impact, $\alpha$ is a collision angle, $\gamma$ is a direction angle, $\beta$ is an incident angle, and coordinate values of the bloodstain scattered by impact are (a, b, c).)

In the calculating of the trajectory of the drop of blood, trajectories (x, y, z) of the drop of blood over time may be calculated by the following equation.

$$x = x_0 + \frac{1}{b}\ln(1 + bv_{ox}t)$$

$$y = y_0 + \frac{1}{b}\ln(1 + bv_{oy}t)$$

$$z = z_0 + \frac{1}{b}\ln\left[\sqrt{1 + \frac{b}{g}v_{oz}^2}\right]\cos - \left[-\sqrt{gb}\,t + \tan^{-1}\sqrt{\frac{b}{g}}v_{oz}\right]$$

(where $(x_0, y_0, z_0)$ are coordinate values of the bleeding site, t is time, g is the gravitational acceleration 9.80665 m/s², and $(v_{ox}, v_{oy}, v_{oz})$ are the initial velocities of the drop of blood, $$b = \frac{1}{2m} C\rho_{air} A$$

$$m = \rho_{blood} \frac{\pi}{6} d^3$$

m is the mass of the drop of blood, $\rho_{blood}$ is the density of blood, in humans, on average, about 1060 kg/m$^3$, d is the diameter of the drop of blood, C is the drag coefficient, pair is the air density, about 1.2 kg/m$^3$ at room temperature, and A is the cross-sectional area of the drop of blood measured at right angles in a moving direction, $\pi d^2$.)

According to one or more embodiments, an electronic device for calculating a bleeding site and a trajectory of bloodstain scattered by impact includes: an image information acquisition unit configured to obtain captured image information including a captured image and a 3D coordinate value of each of two or more bloodstains scattered by impact; an image information analysis unit configured to analyze the obtained captured image information to calculate a collision angle and measure a direction angle of the bloodstain scattered by impact; a bleeding site calculation unit configured to calculate a coordinate value of the bleeding site by using a linear trajectory method; a trajectory calculation unit configured to calculate a trajectory of a drop of blood based on the calculated coordinate value of the bleeding site by using a parabolic trajectory method considering gravity and air resistance; and an output unit configured to display and output a linear trajectory of the drop of blood and a parabolic trajectory considering gravity and air resistance of the drop of blood on a 3D space.

The electronic device may further include an input unit, and the input unit may allow a user to select the captured image and input a 3D coordinate value of a corresponding bloodstain scattered by impact.

The collision angle may be calculated by the following equation by measuring the length and width of the bloodstain scattered by impact in the captured image.

$$\alpha = \sin^{-1}\left(\frac{W}{L}\right)$$

(where $\alpha$ is a collision angle, L is a length of the bloodstain scattered by impact, and W is a width of the bloodstain scattered by impact.)

The bleeding site calculation unit may calculate the coordinate values ($x_0$, $y_0$, $z_0$) of the bleeding site by the following equation.

$$x_0 = D \sin(\beta_L)\sin(\beta_R)/\sin(\beta_L+\beta_R)$$

$$y_0 = D \cos(\beta_L)\sin(\beta_R)/\sin(\beta_L+\beta_R)$$

$$z_0 = c - \frac{x_0}{\tan\beta \tan\gamma}$$

$$\beta_L = \tan^{-1}[\tan(\alpha_L)/\sin(\gamma_L)]$$

$$\beta_R = \tan^{-1}[\tan(\alpha_R)/\sin(\gamma_R)]$$

(where D is a distance between two bloodstains scattered by impact, $\alpha$ is a collision angle, $\gamma$ is a direction angle, $\beta$ is an incident angle, and coordinate values of the bloodstain scattered by impact are (a, b, c).)

The trajectory calculation unit may calculate the trajectories (x, y, z) of the drop of blood over time by the following equation.

$$x = x_0 + \frac{1}{b}\ln(1 + bv_{ox}t)$$

$$y = y_0 + \frac{1}{b}\ln(1 + bv_{oy}t)$$

$$z = z_0 + \frac{1}{b}\ln\left[\sqrt{1 + \frac{b}{g}v_{oz}^2}\right]\cos\left[-\sqrt{gb}\,t + \tan^{-1}\sqrt{\frac{b}{g}}v_{oz}\right]$$

(where ($x_0$, $y_0$, $z_0$) are coordinate values of the bleeding site, t is time, g is the gravitational acceleration 9.80665 m/s$^2$, and ($v_{0x}$, $v_{0x}$, $v_{0x}$) are initial velocities of the drop of blood, $$b = \frac{1}{2m}C\rho_{air}A$$

$$m = \rho_{blood}\frac{\pi}{6}d^3$$

m is the mass of the drop of blood, $\rho_{blood}$ is the density of blood, in humans, on average, about 1060 kg/m$^3$, d is the diameter of the drop of blood, C is the drag coefficient, pair is the air density, about 1.2 kg/m$^3$ at room temperature, and A is the cross-sectional area of the drop of blood measured at right angles in a moving direction, $\pi d^2$.)

The trajectory calculation unit may calculate the trajectory of the drop of blood by inputting the coordinate values ($x_0$, $y_0$, $z_0$) of the bleeding site, the initial velocities ($v_{0x}$, $v_{0y}$, $v_{0z}$) of the drop of blood, the diameter d of the drop of blood, and an input value of the drag coefficient C to the input unit.

According to one or more embodiments, a computer program is stored in a non-transitory computer-readable storage medium in order to execute a method of calculating a bleeding site and a trajectory of a bloodstain scattered by impact according to an embodiment by using a computer.

In addition to this, another method and another system for implementing the disclosure, and a non-transitory computer-readable recording medium for recording a computer program for executing the method may be further provided.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
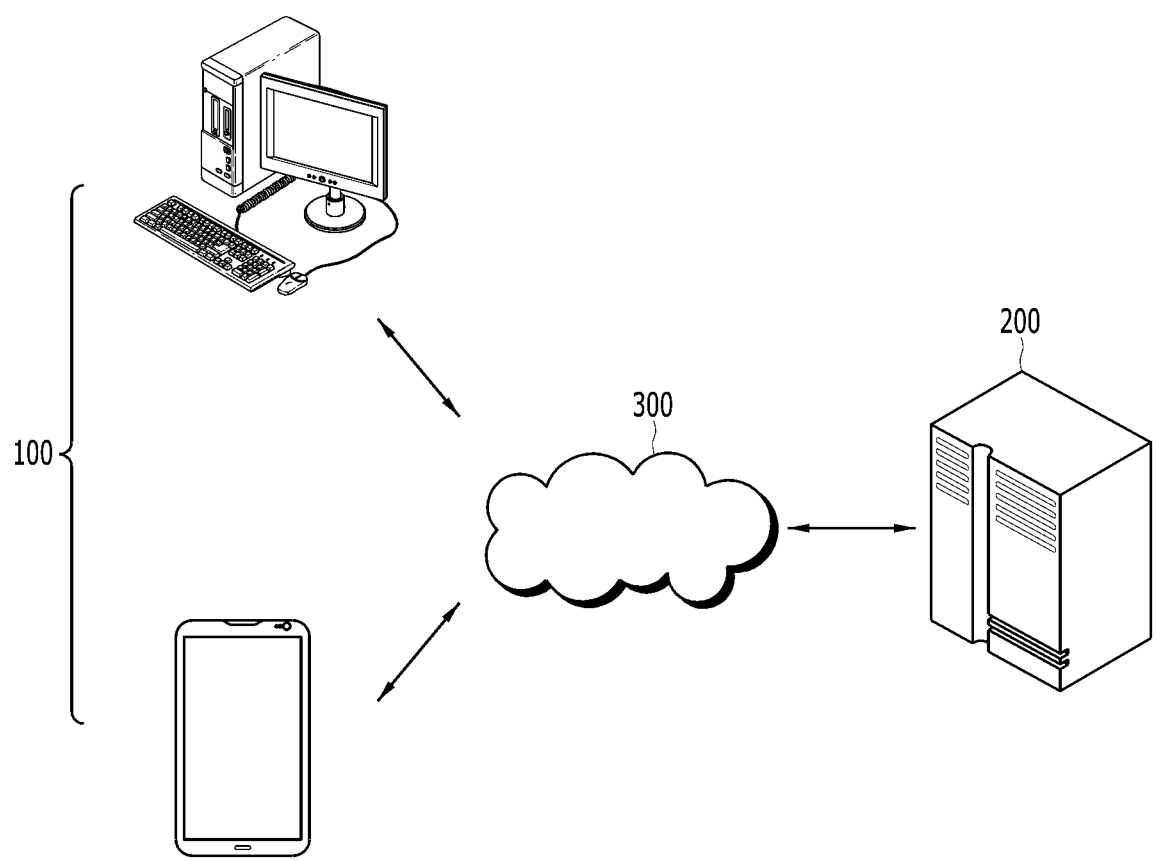
FIG. 1 is a view of a system for calculating a bleeding site and a trajectory of a bloodstain scattered by impact, according to an embodiment.

Hereinafter, embodiments will be described in detail with reference to the accompanying drawings. The same reference numerals are used to denote the same elements, and repeated descriptions thereof will be omitted.

It will be understood that although the terms "first," "second," etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components. It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of description, the following embodiments are not limited thereto.

When a certain embodiment may be implemented differently, a specific process order may be performed differently from the described order. For example, two consecutively described processes may be performed substantially at the same time or performed in an order opposite to the described order.

It will be understood that when a layer, region, or component is connected to another portion, the layer, region, or component may be directly connected to the portion or an intervening layer, region, or component may exist. For example, when a layer, region, or component is electrically connected to another portion, the layer, region, or component may be directly electrically connected to the portion or may be indirectly connected to the portion through another layer, region, or component.

In the specification, 'bloodstain scattered by impact' refers to traces of blood blown off by the impact of a weapon, etc. as a wound is formed at the moment of being hit. The 'bloodstain scattered by impact' has a regular pattern in which the bloodstain changes from a perfect circle shape to a pointed oval shape as the distance from the center of the bleeding site increases. Through the bloodstain pattern analysis, it is possible to find the bleeding site of the bloodstain scattered by impact, and through this, it is possible to determine in which position and posture the victim was hit by the perpetrator.

FIG. 1 is a view of a system for calculating a bleeding site and a trajectory of a bloodstain scattered by impact, according to an embodiment.

Referring to FIG. 1, the system for calculating the bleeding site and the trajectory of the bloodstain scattered by impact, according to an embodiment, may include a user terminal 100, a server 200, and a network 300 connecting them.

The system for calculating the bleeding site and the trajectory of the bloodstain scattered by impact, according to an embodiment, provides a service for calculating a bleeding site and a trajectory of a bloodstain scattered by impact. In more detail, according to the system for calculating the bleeding site and the trajectory of the bloodstain scattered by impact provided according to an embodiment, a user may upload data obtained by a method of calculating a bleeding site and a trajectory of a bloodstain scattered by impact to be described later below and share the uploaded data with other users. For example, a user may upload data about captured images and three-dimensional (3D) coordinate values of a plurality of bloodstains scattered by impact. The system for calculating the bleeding site and the trajectory of the bloodstain scattered by impact, according to an embodiment, may register the data uploaded by the user to the server 200 and may provide an interface through which other users may inquire the data registered to the server 200. The system for calculating the bleeding site and the trajectory of the bloodstain scattered by impact, according to an embodiment, may build a database of the data about the captured images and the 3D coordinate values of the plurality of bloodstains scattered by impact.

The user terminal 100 may be connected to the server 200 through the network 300. The user terminal 100 to which the disclosure is applied may be various types of information processing devices used by a user, for example, a personal computer (PC), a laptop computer, a mobile phone, a tablet PC, a smart phone, personal digital assistants (PDA), or the like. This is only an example, and in addition to the above-described examples, it should be interpreted as a concept including all devices capable of communication that are currently developed and commercialized or to be developed in the future. A method of calculating a bleeding site and a trajectory of a bloodstain scattered by impact provided according to an embodiment may be borrowed without limitation on any device as long as an application in which the method is programmed can be installed.

Although not shown in the drawing, the server 200 may include a memory, an input/output unit, a program storage unit, and a control unit.

The network 300 connects the user terminal 100 to the server 200. For example, the network 300 provides a connection path such that the user terminal 100 may transmit and receive packet data after accessing the server 200.

Figure 2:
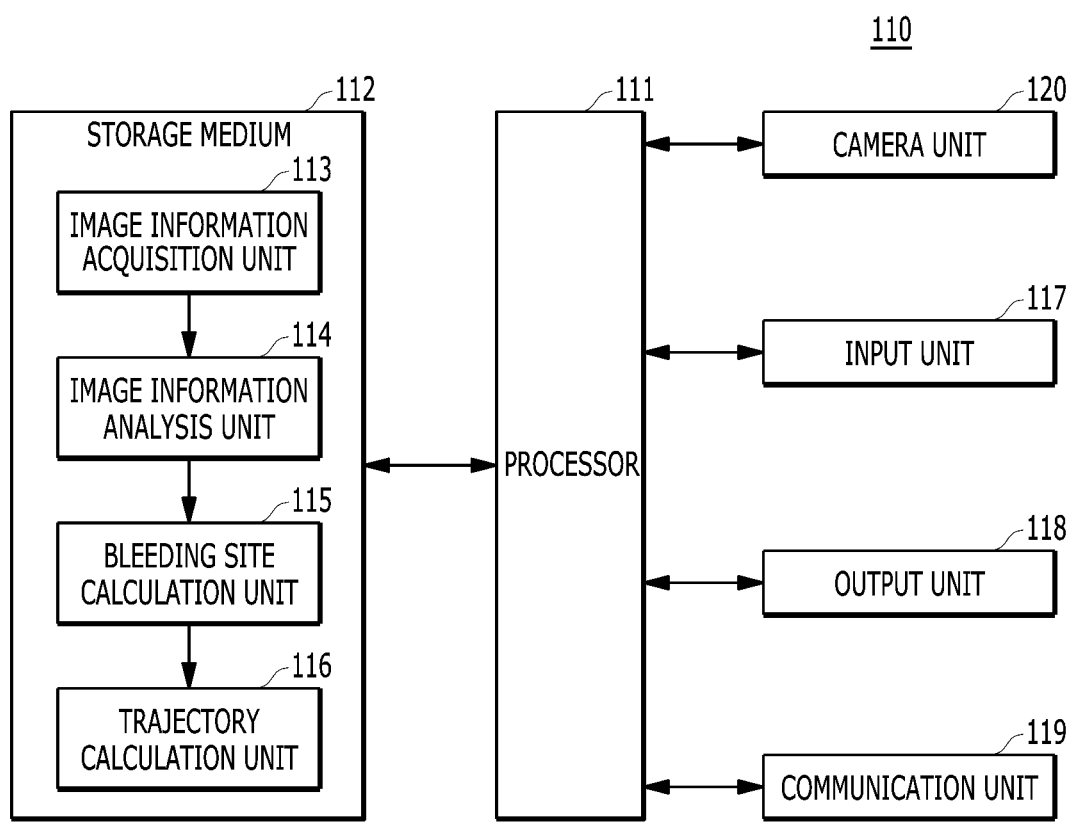
FIG. 2 is a schematic block diagram of an electronic device for calculating a bleeding site and a trajectory of a bloodstain scattered by impact, according to an embodiment.

FIG. 2 is a block diagram schematically illustrating an electronic device 110 for calculating the bleeding site and the trajectory of the bloodstain scattered by impact provided in the user terminal 100 illustrated in FIG. 1.

As shown in FIG. 2, the electronic device 110 for calculating the bleeding site and trajectory of the bloodstain scattered by impact may include a camera unit 120, a processor 111, a storage medium 112, an input unit 117, an output unit 118, and a communication unit 119.

The camera unit 120 may generate a captured image of each of two or more bloodstains scattered by impact.

The processor 111 controls general operations of the electronic device 110 for calculating the bleeding site and trajectory of the bloodstain scattered by impact. The processor 111 may include one or a plurality of processors. For example, the processor 111 may generally control the input unit 117, the output unit 118, the communication unit 119, and the like by executing programs stored in the storage medium 112.

The storage medium 112 may store a program for processing and control of the processor 111 or may store input/output data.

The storage medium 112 may include all types of storage media such as read access memory (RAM), read only memory (ROM), a hard disk drive (HDD), a flash memory, CD-ROM, and DVD. In addition, the storage medium 112 may provide stored data according to the request of the processor 111.

Accordingly, the storage medium 112 may include an image information acquisition unit 113, an image information analysis unit 114, a bleeding site calculation unit 115, and a trajectory calculation unit 116 to calculate the bleeding site and the trajectory of the bloodstain scattered by impact.

The image information acquisition unit 113 may obtain captured image information of two or more bloodstains scattered by impact. The captured image information may include a captured image and a 3D coordinate value of each of the two or more bloodstains scattered by impact. In this case, the captured image may be obtained by directly photographing the bloodstain scattered by impact at the crime scene through the camera unit 120, or by loading the previously captured image from the storage medium 112.

The image information analysis unit 114 may analyze the obtained captured image information to calculate a collision angle and measure a direction angle of the bloodstain scattered by impact.

Figure 3:
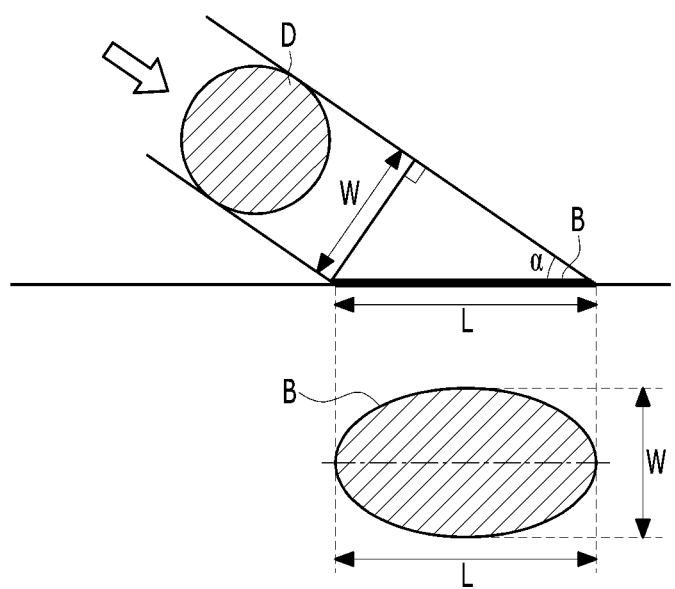
FIG. 3 is a view showing the derivation of a collision angle of a bloodstain scattered by impact through geometric analysis.
Figure 4:
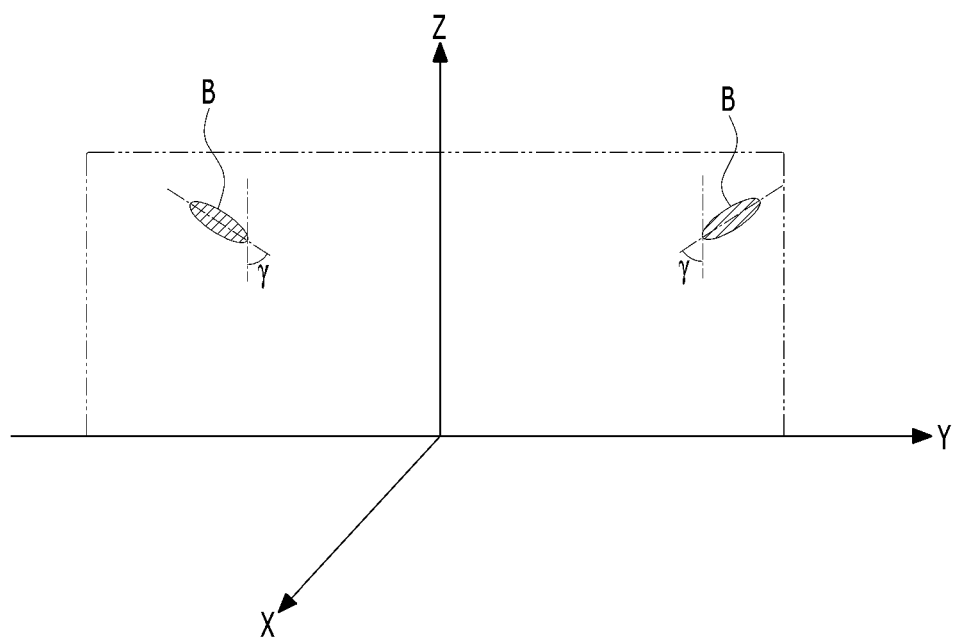
FIG. 4 is a view showing a direction angle of a bloodstain scattered by impact.

FIG. 3 is a view showing the derivation of a collision angle of a bloodstain scattered by impact through geometric analysis, and FIG. 4 is a view showing a direction angle of a bloodstain scattered by impact.

Referring to FIG. 3, when a drop of blood D fall with a collision angle of $\alpha$ with respect to a bottom surface, a bloodstain scattered by impact B is generated. At this time, a collision angle $\alpha$ of the bloodstain scattered by impact B may be calculated as follows by measuring a length L and a width W of the bloodstain scattered by impact B.

$$\alpha = \sin^{-1}\left(\frac{W}{L}\right)$$

As shown in FIG. 4, a direction angle $\gamma$ of the bloodstain scattered by impact B may be measured by analyzing a captured image of the bloodstain scattered by impact B.

The bleeding site calculation unit 115 may calculate a coordinate value of a bleeding site by using a linear trajectory method.

Figure 5:
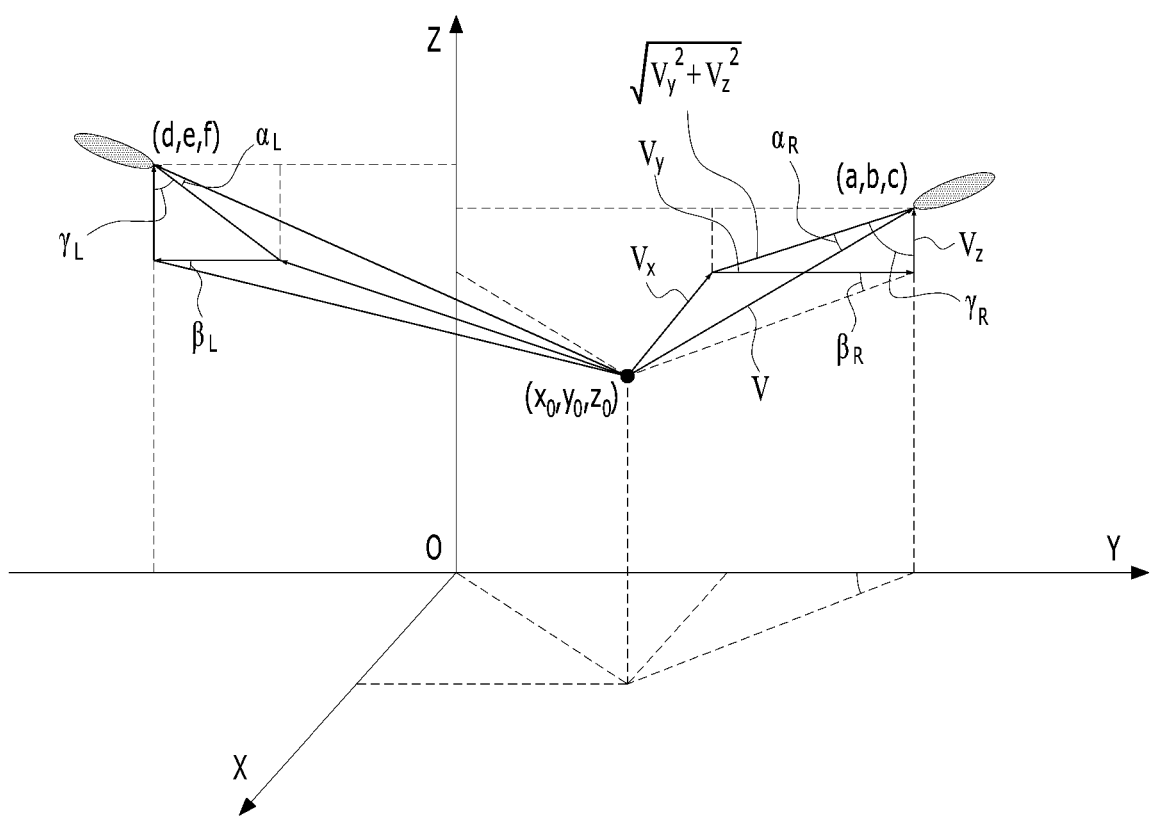
FIG. 5 is a view of the analysis of a bleeding site of a bloodstain scattered by impact by a linear trajectory method.

FIG. 5 is a view of the analysis of a bleeding site of a bloodstain scattered by impact by a linear trajectory method. Referring to FIG. 5, coordinate values $(x_0, y_0, z_0)$ of the bleeding site by using the linear trajectory method may be obtained through the following equation.

$$x_0 = D\ \sin(\beta_L)\sin(\beta_R)/\sin(\beta_L+\beta_R)$$

$$y_0 = D\ \cos(\beta_L)\sin(\beta_R)/\sin(\beta_L+\beta_R)$$

$$z_0 = c - \frac{x_0}{\tan\beta\ \tan\gamma}$$

Where D is a distance between two bloodstains scattered by impact, a coordinate value of the bloodstain scattered by impact is R=(a,b,c), and $\beta$ is an incident angle. At this time, the incident angle $\beta$ may be calculated from the collision angle $\alpha$ and the direction angle $\gamma$ as follows.

$$\beta_L = \tan^{-1}[\tan(\alpha_L)/\sin(\gamma_L)]$$

$$\beta_R = \tan^{-1}[\tan(\alpha_R)/\sin(\gamma_R)]$$

The trajectory calculation unit 116 may calculate a trajectory of a drop of blood based on the calculated coordinate value of the bleeding site by using a parabolic trajectory method considering gravity and air resistance.

Trajectories (x, y, z) of a drop of blood over time may be calculated as follows, and is represented by a parabolic line.

$$x = x_0 + \frac{1}{b}\ln(1 + bv_{ox}t)$$

$$y = y_0 + \frac{1}{b}\ln(1 + bv_{oy}t)$$

$$z = z_0 + \frac{1}{b}\ln\left[\sqrt{1 + \frac{b}{g}v_{oz}^2}\right]\cos\left[-\sqrt{gb}\,t + \tan^{-1}\sqrt{\frac{b}{g}}v_{oz}\right]$$

Where $(x_0, y_0, z_0)$ are coordinate values of the bleeding site, t is time, g is the gravitational acceleration 9.80665 m/s², and $(v_{0x}, v_{0x}, v_{0x})$ are the initial velocities of a drop of blood, $$b = \frac{1}{2m}C\rho_{air}A$$

$$m = \rho_{blood}\frac{\pi}{6}d^3$$

m is the mass of a drop of blood, $\rho_{blood}$ is the density of blood, in humans, on average, about 1060 kg/m³, d is the diameter of a drop of blood, C is the drag coefficient, Pair is the air density, about 1.2 kg/m³ at room temperature, and A is the cross-sectional area of a drop of blood measured at right angles in a moving direction, $\pi d^2$.

The input unit 117 is a unit for generating a user input signal for controlling or operating the electronic device 110 that calculates the bleeding site and trajectory of the bloodstain scattered by impact according to the user's operation, and may be implemented as various input units. For example, the input unit 117 may include one or more of a key input unit, a touch input unit, a gesture input unit, and a voice input unit. The input unit 117 may include a keyboard, a key pad, a touch pad, a jog wheel, a jog switch, etc., but is not limited thereto.

For example, a user may select a captured image and input a 3D coordinate value of a corresponding bloodstain scattered by impact to the input unit 117.

In addition, in order to obtain the parabolic trajectories (x, y, z) of the drop of blood over time, the coordinate values ($x_0$, $y_0$, $z_0$) of the bleeding site, the initial velocities ($v_{0x}$, $v_{0x}$, $v_{0x}$) of the drop of blood, the diameter d of the drop of blood, and the drag coefficient C may be input to the input unit 117 as input values.

The output unit 118 outputs information processed by the electronic device 110 that calculates the bleeding site and the trajectory of the bloodstain scattered by impact. The output unit 118 performs functions for outputting information in the form of numbers, characters, images, and graphics. The output unit 118 may output a user interface provided by executing programs stored in the storage medium 112. For example, the output unit 118 may be implemented as any one of a liquid crystal display (LCD), a thin film transistor-liquid crystal display (TFT-LCD), light emitting diodes (LED), organic light emitting diodes (OLED), active matrix organic light emitting diodes (AMOLED), a flexible display, or a 3D display.

The output unit 118 may display a linear trajectory of a drop of blood and a parabolic trajectory considering gravity and air resistance on a 3D space. For example, the output unit 118 may output only a linear trajectory of a drop of blood, or may visually display only a parabolic trajectory of a drop of blood considering gravity and air resistance. On the other hand, the linear trajectory of the drop of blood and the parabolic trajectory of the drop of blood are displayed on the same 3D space so that they may be visually compared.

The communication unit 119 may include one or more components that enable communication between the electronic device 110 that calculates the bleeding site and the trajectory of the bloodstain scattered by impact and other external devices, the server 200, and the like. The communication unit 119 is a unit for transmitting and receiving data to and from an external device through the electronic device 110 that calculates the bleeding site and the trajectory of the bloodstain scattered by impact and the network 300, and may be used to receive related data from other external devices.

The communication unit 119 may transmit data including a captured image and a 3D coordinate value of each of two or more bloodstains scattered by impact, a coordinate value of a bleeding site, a linear trajectory of a drop of blood, and a parabolic trajectory considering gravity and air resistance of a drop of blood to an external device.

Hereinafter, a method of calculating a bleeding site and a trajectory of a bloodstain scattered by impact according to an embodiment will be described with reference to FIGS. 6 to 11.

Figure 6:
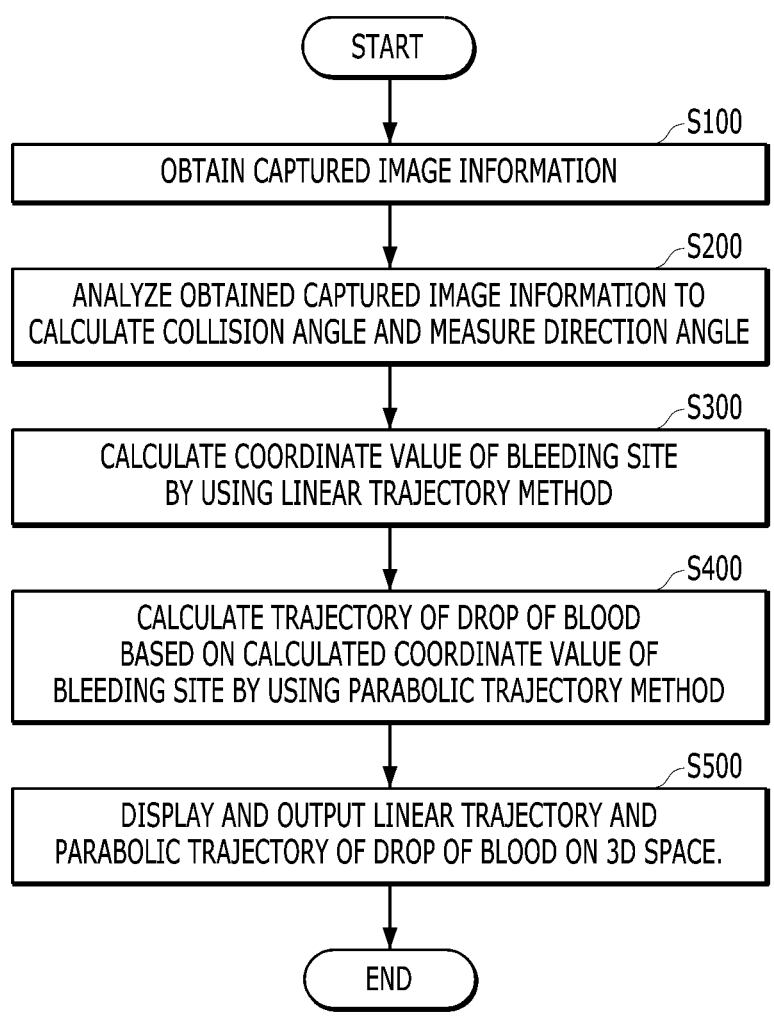
FIG. 6 is a flowchart illustrating a method of calculating a bleeding site and a trajectory of a bloodstain scattered by impact, according to an embodiment.

FIG. 6 is a flowchart illustrating a method of calculating a bleeding site and a trajectory of a bloodstain scattered by impact, according to an embodiment. FIGS. 7 to 11 are exemplary diagrams of an embodiment of a method of calculating a bleeding site and a trajectory of a bloodstain scattered by impact, according to an embodiment.

In operation S100, the electronic device 110 that calculates a bleeding site and a trajectory of a bloodstain scattered by impact may obtain captured image information of two or more bloodstains scattered by impact. The captured image information may include a captured image and a 3D coordinate value of each of the two or more bloodstains scattered by impact.

The captured image may be obtained by directly photographing a bloodstain scattered by impact at the crime scene through the camera unit 120, or by loading the previously captured image from the storage medium 112. Alternatively, the captured image may be obtained by downloading from another external device or the server 200 of a system that calculates a bleeding site and a trajectory of a bloodstain scattered by impact.

In operation S200, the electronic device 110 may analyze the obtained captured image information to calculate a collision angle and measure a direction angle of the bloodstain scattered by impact.

Figure 9:
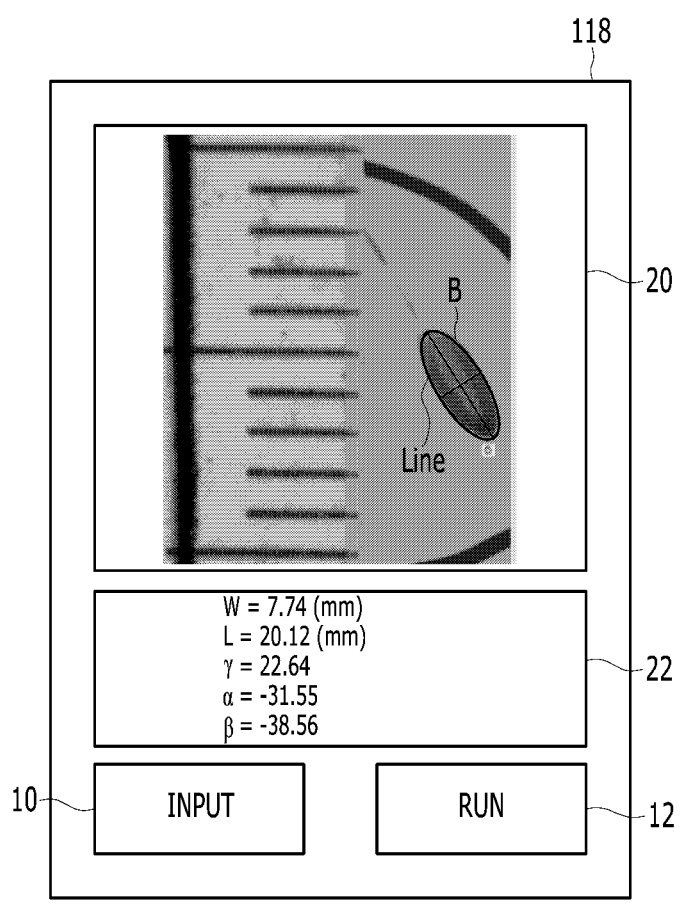

The electronic device 110 may analyze the obtained captured image to distinguish each bloodstain scattered by impact from a background image. For example, as shown in FIG. 9, an elliptical guideline Line is formed around the bloodstain scattered by impact B, so that the length L, the width W, and the direction angle $\gamma$ of the bloodstain scattered by impact B may be measured.

In this case, referring to FIG. 3, the collision angle $\alpha$ of the bloodstain scattered by impact may be calculated by inputting the measured length L and the width W of the bloodstain scattered by impact into the following equation.

$$\alpha = \sin^{-1}\left(\frac{W}{L}\right)$$

In operation S300, the electronic device 110 may calculate a coordinate value of a bleeding site by using a linear trajectory method.

At this time, the coordinate values ($x_0$, $y_0$, $z_0$) of the bleeding site may be calculated by inputting the 3D coordinate values, the collision angle $\alpha$, and the direction angle $\gamma$ of the two or more bloodstains scattered by impact into the following equation.

$$x_0 = D\,\sin(\beta_L)\sin(\beta_R)/\sin(\beta_L+\beta_R)$$

$$y_0 = D\,\cos(\beta_L)\sin(\beta_R)/\sin(\beta_L+\beta_R)$$

$$z_0 = c - \frac{x_0}{\tan\beta\,\tan\gamma}$$

$$\beta_L = \tan^{-1}[\tan(\alpha_L)/\sin(\gamma_L)]$$

$$\beta_R = \tan^{-1}[\tan(\alpha_R)/\sin(\gamma_R)]$$

Where $\alpha$ is the collision angle, $\gamma$ is the direction angle, and $\beta$ is the incident angle. A coordinate value of the bloodstain scattered by impact is R=(a,b,c), and D is a distance between two bloodstains scattered by impact. When the coordinate values of the two bloodstains scattered by impact are R=(a,b,c) and R'=(d,e,f), respectively, and D may be expressed by the following equation.

$$D = \sqrt{(a-d)^2+(b-e)^2+(c-f)^2}$$

In operation S400, the electronic device 110 may calculate a trajectory of a drop of blood based on the calculated coordinate value of the bleeding site by using a parabolic trajectory method considering gravity and air resistance.

The trajectories (x, y, z) of a drop of blood over time may be calculated as follows, and are represented by a parabolic line.

$$x = x_0 + \frac{1}{b}\ln(1 + bv_{ox}t)$$

$$y = y_0 + \frac{1}{b}\ln(1 + bv_{oy}t)$$

$$z = z_0 + \frac{1}{b}\ln\left[\sqrt{1 + \frac{b}{g}v_{oz}^2}\right]\cos\left[-\sqrt{gb}\,t + \tan^{-1}\sqrt{\frac{b}{g}}v_{oz}\right]$$

Where ($x_0$, $y_0$, $z_0$) are coordinate values of the bleeding site, t is time, g is the gravitational acceleration 9.80665 m/s$^2$, ($v_{0x}$, $v_{0x}$, $v_{0x}$) are the initial velocities of a drop of blood, $$b = \frac{1}{2m}C\rho_{air}A$$

$$m = \rho_{blood}\frac{\pi}{6}d^3$$

m is the mass of a drop of blood, $\rho_{blood}$ is the density of blood, in humans, on average, about 1060 kg/m$^3$, d is the diameter of a drop of blood, C is the drag coefficient, Pair is the air density, about 1.2 kg/m$^3$ at room temperature, and A is the cross-sectional area of a drop of blood measured at right angles in a moving direction, $\pi d^2$.

At this time, in order to obtain the parabolic trajectories (x, y, z) of a drop of blood over time, the coordinate values ($x_0$, $y_0$, $z_0$) of the bleeding site, the initial velocities ($v_{0x}$, $v_{0x}$, $v_{0x}$) of a drop of blood, the diameter d of a drop of blood, and the drag coefficient C may be input to the input unit 117 so that the trajectory of the drop of blood may be calculated.

In operation S500, the electronic device 110 may display and output a linear trajectory of a drop of blood and a parabolic trajectory considering gravity and air resistance of a drop of blood on a 3D space.

Figure 10:
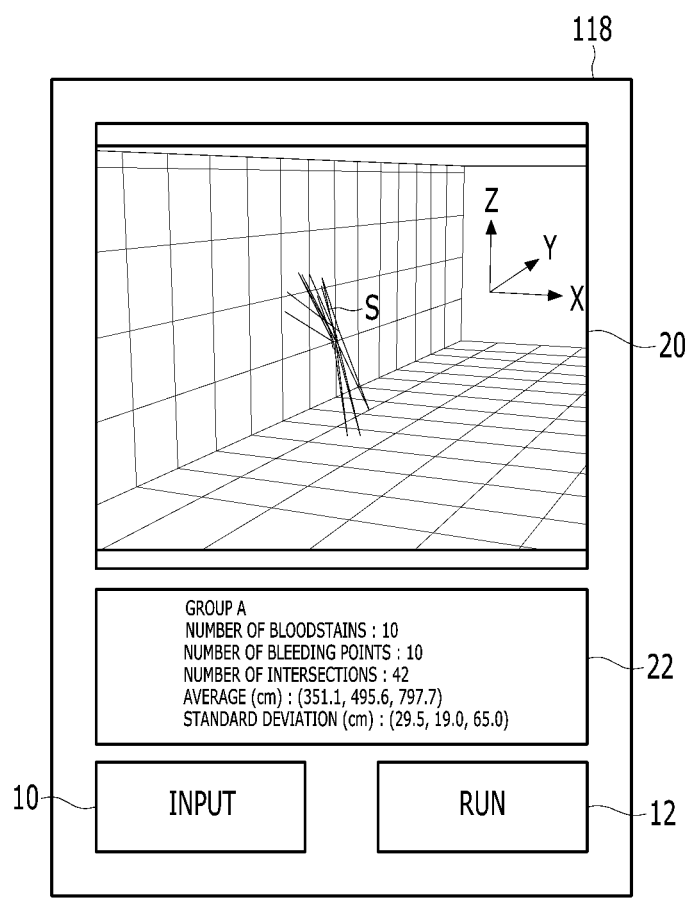
Figure 11:
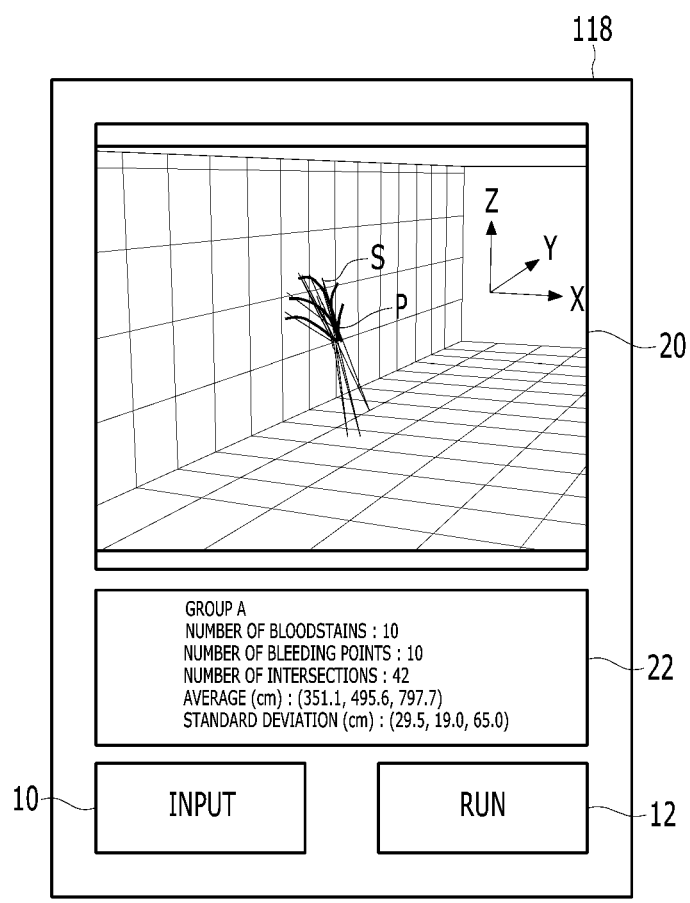

FIG. 10 is a view of a linear trajectory of a drop of blood, and FIG. 11 is a view illustrating a linear trajectory and a parabolic trajectory of a drop of blood in one 3D space. FIG. 11 shows a linear trajectory S and a parabolic trajectory P of a drop of blood in the same 3D space for the same bleeding site of bloodstains scattered by impact. The linear trajectory S is based on a linear trajectory method based on the assumption that drop of bloods fly in a straight line. When flying in the air, the actual drop of blood moves according to the parabolic trajectory P due to effects of gravity and air resistance. Therefore, when a drop of blood moves from the same bleeding site, a bloodstain scattered by impact by the parabolic trajectory P is located at a lower place than a bloodstain scattered by impact by the linear trajectory S. Because the actual drop of blood moves according to the parabolic trajectory P, it is possible to visually compare and confirm the validity of a calculation result of the bleeding site by the linear trajectory method.

An embodiment will be described with reference to FIGS. 7 to 11.

Figure 7:
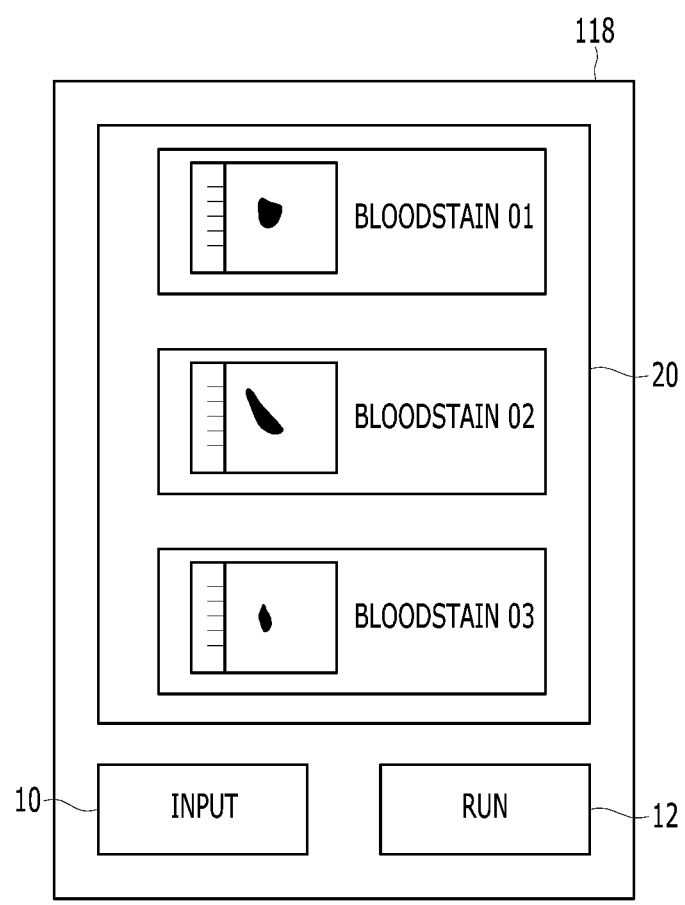
FIGS. 7 to 11 are exemplary diagrams of an embodiment of a method of calculating a bleeding site and a trajectory of a bloodstain scattered by impact, according to an embodiment.

In FIG. 7, when an installed program is executed, the electronic device 110 may display captured images of a plurality of bloodstains scattered by impact on an image screen 20 such that a user may select captured image information through the output unit 118. A user may select a captured image of a bloodstain scattered by impact by using an input button 10.

Figure 8:
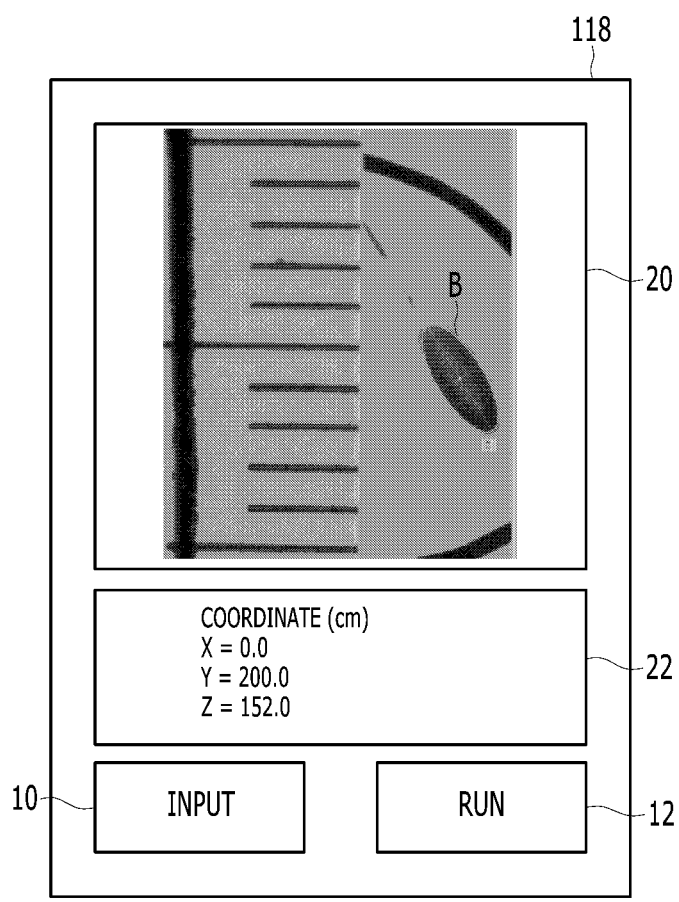

As shown in FIG. 8, a captured image of one selected bloodstain scattered by impact B is displayed on the image screen 20, and a 3D coordinate value for this may be displayed on a measured data screen 22. A 3D coordinate value of the bloodstain scattered by impact B may be directly input by a user using the input button 10.

When a run button 12 is touched in FIG. 8, as shown in FIG. 9, an elliptical guideline Line is generated in a shape surrounding the bloodstain scattered by impact B, and the length L and the width W of the bloodstain scattered by impact B may be clearly measured, and accordingly, the direction angle γ may be measured. Accordingly, values of the collision angle α and the incident angle β may be calculated and displayed on the measured data screen 22.

FIG. 10, by repeating the above process for each bloodstain scattered by impact of a specific group of bloodstains scattered by impact to calculate a bleeding site, shows the linear trajectory S of a drop of blood connecting the bleeding site to the bloodstain scattered by impact on the image screen 20 in a 3D space. For example, FIG. 10 may display the linear trajectory S of the drop of blood on the image screen 20 by calculating a bleeding site of a bloodstain scattered by impact included in 'group A', and may display related data such as the number of bloodstains and the number of bleeding sites (bleeding points) on the measured data screen 22.

FIG. 11 shows the parabolic trajectory P of a drop of blood considering gravity and air resistance, along with the linear trajectory S, on a 3D space, based on a coordinate value of a bleeding site of a bloodstain scattered by impact obtained by using a linear trajectory method. The linear trajectory S may be expressed by connecting the bloodstain scattered by impact to the bleeding site, and the parabolic trajectory P may be expressed by a parabolic trajectory method based on a calculated coordinate value. Therefore, the linear trajectory S and the parabolic trajectory P of the drop of blood are scattered from the same bleeding site and may be expressed together in a 3D space. Therefore, it is possible to visually compare the linear trajectory S of the drop of blood with the parabolic trajectory P considering the actual gravity and air resistance of the drop of blood.

By implementing the linear trajectory S and the parabolic trajectory P of a drop of blood in the same 3D space as described above, it is possible to know to what extent a calculation result of a bleeding site of a bloodstain scattered by impact by the linear trajectory method is valid, and it is possible to visually accurately understand a motion trajectory of the actual drop of blood.

The method of calculating the bleeding site and the trajectory of the bloodstain scattered by impact according to an embodiment shown in FIG. 6 may be written as computer programs and may be implemented in general-use digital computers that execute the programs using a non-transitory computer-readable recording medium. The non-transitory computer-readable recording medium may be a magnetic storage medium (e.g., ROM, a floppy disk, a hard disk, etc.), or an optical reading medium (e.g., a CD ROM, a digital versatile disk (DVD) or the like).

According to the embodiments as described above, by comparing a linear trajectory of a drop of blood with a parabolic trajectory considering gravity and air resistance of a drop of blood, exact dynamics of the drop of blood may be established, thereby contributing to finding an accurate motion model of the drop of blood. In this way, it is possible to find a more accurate motion model of a drop of blood and analyze a complex bloodstain pattern, thereby effectively contributing to solving a criminal case.

According to an embodiment, by calculating a bleeding site of a bloodstain scattered by impact based on the assumption that a drop of blood flies in a straight line, and by calculating a parabolic trajectory considering gravity and air resistance based on the calculated bleeding site of the bloodstain scattered by impact, the validity of a calculation result of the bleeding site of the bloodstain scattered by impact by a linear trajectory method may be determined.

In addition, according to an embodiment, it is possible to more accurately understand and analyze the motion of an actual drop of blood, thereby contributing to solving a criminal case through bloodstain pattern analysis.

The description herein is for the purpose of describing the disclosure and numerous modifications and adaptations will be readily apparent to one of ordinary skill in the art without departing from the spirit and scope of the disclosure.

In this regard, the present embodiments may have different forms and should not be construed as being limited to the descriptions set forth herein. While the disclosure has been particularly shown and described with reference to embodiments thereof, it will be understood that various changes in form and details may be made therein without departing from the spirit and scope of the following claims.

What is claimed is:

1. A method of calculating a bleeding site and a trajectory of a bloodstain scattered by impact, the method comprising:
   obtaining, by an electronic device calculating the bleeding site and the trajectory of the bloodstain scattered by impact, captured image information including a captured image and a three-dimensional (3D) coordinate value of each of two or more bloodstains scattered by impact;
   analyzing the obtained captured image information, by the electronic device, and calculating a collision angle and measuring a direction angle of each of the two or more bloodstains scattered by impact;
   calculating, by the electronic device, the 3D coordinate value of the bleeding site based on the assumption that drops of blood fly in a straight line;
   calculating, by the electronic device, a trajectory of a drop of blood under an influence of gravity and air resistance based on the calculated 3D coordinate value of the bleeding site; and
   displaying and outputting, by the electronic device, a linear trajectory of the drop of blood and a parabolic trajectory considering gravity and air resistance of the drop of blood on a 3D space.

2. The method of claim 1, wherein the collision angle is calculated by the following equation by measuring a length and a width of the bloodstain scattered by impact in the captured image:

$$\alpha = \sin^{-1}\left(\frac{W}{L}\right),$$

and
   wherein $\alpha$ is the collision angle, L is the length of the bloodstain scattered by impact, and W is the width of the bloodstain scattered by impact.

3. The method of claim 1, wherein the 3D coordinate value of the bleeding site is represented by $(x_0, y_0, z_0)$ and calculated by the following equations:

$$x_0 = D\sin(\beta_L)\sin(\beta_R)/\sin(\beta_L+\beta_R)$$

$$y_0 = D\cos(\beta_L)\sin(\beta_R)/\sin(\beta_L+\beta_R)$$

$$z_0 = c - \frac{x_0}{\tan\beta_R \tan\gamma_R}$$

$$\beta_L = \tan^{-1}[\tan(\alpha_L)/\sin(\gamma_L)]$$

$$\beta_R = \tan^{-1}[\tan(\alpha_R)/\sin(\gamma_R)]$$

wherein D is a distance between two bloodstains scattered by impact and 3D coordinate values of the two bloodstains scattered by the impact are represented by (a, b, c) and (d, e, f), and
   wherein $\alpha_R$ is a first collision angle, $\gamma_R$ is a first direction angle, and $\beta_R$ is a first incident angle at the position (a, b, c), and $\alpha_L$ is a second collision angle, $\gamma_L$ is a second direction angle, and $\beta_L$ is a second incident angle at the position (d, e, f).

4. The method of claim 1, wherein in the calculating of the trajectory of the drop of blood, trajectories (x, y, z) of the drop of blood over time are calculated by the following equations:

$$x = x_0 + \frac{1}{b}\ln(1 + bv_{ox}t)$$

$$y = y_0 + \frac{1}{b}\ln(1 + bv_{oy}t)$$

$$z = z_0 + \frac{1}{b}\ln\left[\sqrt{1 + \frac{b}{g}v_{oz}^2}\right]\cos\left[-\sqrt{gb}\,t + \tan^{-1}\sqrt{\frac{b}{g}v_{oz}^2}\right]$$

where $(x_0, y_0, z_0)$ is the 3D coordinate value of the bleeding site, t is time, g is the gravitational acceleration 9.80665 m/s$^2$, and $(v_{ox}, v_{oy}, v_{oz})$ is an initial velocity of the drop of blood, and $$m = \rho_{blood}\frac{\pi}{6}d^3$$

where m is a mass of the drop of blood, $\rho_{blood}$ is a density of blood, in humans, on average, about 1060 kg/m$^3$, d is a diameter of the drop of blood, C is a drag coefficient, pair is an air density, about 1.2 kg/m$^3$ at room temperature, and A is a cross-sectional area of the drop of blood measured at right angles in a moving direction, $\pi d^2$.

5. An electronic device that calculates a bleeding site and a trajectory of a bloodstain scattered by impact, the electronic device comprising:

an image information acquisition unit configured to obtain captured image information including a captured image and a three-dimensional (3D) coordinate value of each of two or more bloodstains scattered by impact;

an image information analysis unit configured to analyze the obtained captured image information to calculate a collision angle and measure a direction angle of each of the two or more bloodstains scattered by impact;

a bleeding site calculation unit configured to calculate the 3D coordinate value of the bleeding site based on the assumption that drops of blood fly in a straight line;

a trajectory calculation unit configured to calculate a trajectory of a drop of blood under an influence of gravity and air resistance based on the calculated 3D coordinate value of the bleeding site; and an output unit configured to display and output a linear trajectory of the drop of blood and a parabolic trajectory considering gravity and air resistance of the drop of blood on a 3D space.

6. The electronic device of claim 5, further comprising:
an input unit,
wherein the input unit allows a user to select the captured image and input the 3D coordinate value of a corresponding bloodstain scattered by impact.

7. The electronic device of claim 5, wherein the collision angle is calculated by the following equation by measuring a length and a width of the bloodstain scattered by impact in the captured image:

$$\alpha = \sin^{-1}\left(\frac{W}{L}\right),$$

and
wherein $\alpha$ is the collision angle, L is the length of the bloodstain scattered by impact, and W is the width of the bloodstain scattered by impact.

8. The electronic device of claim 5, wherein the bleeding site calculation unit calculates the 3D coordinate value of the bleeding site, represented by ($x_0$, $y_0$, $z_0$), by the following equations:

$$x_0 = D \sin(\beta_L)\sin(\beta_R)/\sin(\beta_L+\beta_R)$$

$$y_0 = D \cos(\beta_L)\sin(\beta_R)/\sin(\beta_L+\beta_R)$$

$$z_0 = c - \frac{x_0}{\tan\beta_R \tan\gamma_R}$$

$$\beta_L = \tan^{-1}[\tan(\alpha_L)/\sin(\gamma_L)]$$

$$\beta_R = \tan^{-1}[\tan(\alpha_R)/\sin(\gamma_R)]$$

wherein D is a distance between two bloodstains scattered by impact and 3D coordinate values of the two bloodstains scattered by the impact are represented by (a, b, c) and (d, e, f), and wherein $\alpha_R$ is a first collision angle, $\gamma_R$ is a first direction angle, and $\beta_R$ is a first incident angle at the position (a, b, c), and $\alpha_L$ is a second collision angle, $\gamma_L$ is a second direction angle, and $\beta_L$ is a second incident angle at the position (d, e, f).

9. The electronic device of claim 5, wherein the trajectory calculation unit calculates trajectories (x, y, z) of the drop of blood over time by the following equations:

$$x = x_0 + \frac{1}{b}\ln(1+bv_{ox}t)$$

$$y = y_0 + \frac{1}{b}\ln(1+bv_{ox}t)$$

$$z = z_0 + \ln\left[\sqrt{1+\frac{b}{g}v_{oz}^2}\cos\left[-\sqrt{gb}\,t+\tan^{-1}\sqrt{\frac{b}{g}v_{oz}^2}\right]\right]$$

where ($x_0$, $y_0$, $z_0$) is the 3D coordinate value of the bleeding site, t is time, g is the gravitational acceleration 9.80665 m/s², and ($v_{ox}$, $v_{oy}$, $v_{oz}$) is an initial velocity of the drop of blood, and $$b = \frac{1}{2m}C\rho_{air}A$$

$$m = \rho_{blood}\frac{\pi}{6}d^3$$

where m is a mass of the drop of blood, $\rho_{blood}$ is a density of blood, in humans, on average, about 1060 kg/m³, d is a diameter of the drop of blood, C is a drag coefficient, $\rho_{air}$ is an air density, about 1.2 kg/m³ at room temperature, and A is a cross-sectional area of the drop of blood measured at right angles in a moving direction, $\pi d^2$.

10. The electronic device of claim 6, wherein the trajectory calculation unit calculates the trajectory of the drop of blood by inputting the 3D coordinate value of the bleeding site ($x_0$, $y_0$, $z_0$), an initial velocity of the drop of blood ($v_{ox}$, $v_{oy}$, $v_{oz}$), a diameter of the drop of blood d, and an input value of the drag coefficient C to the input unit.

11. A non-transitory computer-readable storage medium storing a computer program for executing a method of calculating a bleeding site and a trajectory of a bloodstain scattered by impact using a computer,
wherein the non-transitory computer-readable storage medium comprises:
an image information acquisition unit configured to obtain captured image information including a captured image and a three-dimensional (3D) coordinate value of each of two or more bloodstains scattered by impact;
an image information analysis unit configured to analyze the obtained captured image information to calculate a collision angle and measure a direction angle of each of the two or more bloodstains scattered by impact;
a bleeding site calculation unit configured to calculate the 3D coordinate value of the bleeding site based on the assumption that drops of blood fly in a straight line; and
a trajectory calculation unit configured to calculate a trajectory of a drop of blood under an influence of gravity and air resistance based on the 3D coordinate value of the bleeding site.

* * * * *